US009047612B2

(12) United States Patent
Anderson et al.

(10) Patent No.: US 9,047,612 B2
(45) Date of Patent: Jun. 2, 2015

(54) SYSTEMS AND METHODS FOR MANAGING CONTENT ASSOCIATED WITH MULTIPLE BRAND CATEGORIES WITHIN A SOCIAL MEDIA SYSTEM

(75) Inventors: James V. Anderson, Atlanta, GA (US); Luis M. Caballero, Atlanta, GA (US); Michael J. Strutton, Villa Rica, GA (US); Brian Culler, Atlanta, GA (US); Micah Z. Wedemeyer, Decatur, GA (US); Erick J. Schmitt, Atlanta, GA (US); Jon M. Lee, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 564 days.

(21) Appl. No.: 12/880,882

(22) Filed: Sep. 13, 2010
(Under 37 CFR 1.47)

(65) Prior Publication Data
US 2011/0145064 A1     Jun. 16, 2011

Related U.S. Application Data

(60) Provisional application No. 61/241,674, filed on Sep. 11, 2009.

(51) Int. Cl.
*G06Q 30/00*       (2012.01)
*G06Q 30/02*       (2012.01)

(52) U.S. Cl.
CPC ............ *G06Q 30/02* (2013.01); *G06Q 30/0241* (2013.01); *G06Q 30/0255* (2013.01); *G06Q 30/0269* (2013.01)

(58) Field of Classification Search
USPC ....................................................... 705/14.53
See application file for complete search history.

(56) References Cited

U.S. PATENT DOCUMENTS 5,749,081 A    5/1998  Whitels
2004/0083133 A1*    4/2004  Nicholas et al. ................ 705/14
(Continued)

OTHER PUBLICATIONS

Towards a New Multimedia Paradigm, Hoogeveen, ED-Media 95 Proceedings. 2005.
(Continued)

*Primary Examiner* — John G Weiss
*Assistant Examiner* — Scott C Anderson
(74) *Attorney, Agent, or Firm* — Vista IP Law Group, LLP

(57) ABSTRACT

Embodiments of the present disclosure generally relate to aspects of an Internet-accessible brand management system (BMS) that allows marketers (e.g., corporations, organizations, etc.) to efficiently organize, create, maintain, and display content associated with many brand categories or brand items within a brand category on a single social media system (SMS) page/account, or alternatively, across many SMS pages or accounts with one or more common content themes. Administrators/developers of individual marketing pages or accounts (global and local) may update their pages through the BMS using standard configurable templates. The system may integrate content from one or more developers to create content for varying pages (for example, by incorporating some global content into local pages according to configurable rules, or vice versa). Subsequently, when a social media system user requests content associated with a particular brand category or brand item within that category on a social media system, the brand management system renders the updated, requested marketing page associated with that category, but within a global marketer page, or with common marketer content also provided.

30 Claims, 14 Drawing Sheets

Exemplary Brand Management System Environment

(56) References Cited

U.S. PATENT DOCUMENTS

| | | |
|---|---|---|
| 2006/0026655 A1 | 2/2006 | Perez |
| 2006/0294134 A1 | 12/2006 | Berkhim et al. |
| 2007/0150335 A1 | 6/2007 | Arnett et al. |
| 2007/0214097 A1 | 9/2007 | Parsons et al. |
| 2007/0250468 A1 | 10/2007 | Pieper |
| 2008/0104679 A1 | 5/2008 | Craig |
| 2008/0109245 A1 | 5/2008 | Gupta |
| 2008/0109306 A1 | 5/2008 | Maigret et al. |
| 2008/0114755 A1 | 5/2008 | Wolters et al. |
| 2008/0168079 A1 | 7/2008 | Smith et al. |
| 2008/0184135 A1 | 7/2008 | Washburn et al. |
| 2008/0189254 A1 | 8/2008 | Cancel et al. |
| 2008/0222295 A1* | 9/2008 | Robinson et al. ............ 709/227 |
| 2008/0248815 A1 | 10/2008 | Busch |
| 2008/0294624 A1 | 11/2008 | Kanigsberg et al. |
| 2009/0006388 A1 | 1/2009 | Ives et al. |
| 2009/0037412 A1 | 2/2009 | Bard et al. |
| 2009/0048904 A1 | 2/2009 | Newton et al. |
| 2009/0049070 A1 | 2/2009 | Steinberg |
| 2009/0063284 A1 | 3/2009 | Turpin et al. |
| 2009/0070412 A1 | 3/2009 | D'Angelo et al. |
| 2009/0119173 A1* | 5/2009 | Parsons et al. .................. 705/14 |
| 2009/0144392 A1 | 6/2009 | Wang et al. |
| 2009/0198487 A1 | 8/2009 | Wong et al. |
| 2009/0216741 A1 | 8/2009 | Thrall et al. |
| 2009/0222348 A1 | 9/2009 | Ransom et al. |
| 2009/0319518 A1 | 12/2009 | Koudas et al. |
| 2010/0063961 A1 | 3/2010 | Guiheneuf et al. |
| 2010/0121857 A1 | 5/2010 | Elmore et al. |
| 2010/0218128 A1 | 8/2010 | Bonat et al. |
| 2010/0228617 A1 | 9/2010 | Ransom et al. |
| 2010/0250330 A1 | 9/2010 | Lam et al. |
| 2010/0318613 A1 | 12/2010 | Souza et al. |
| 2010/0332330 A1 | 12/2010 | Goel et al. |
| 2011/0004692 A1 | 1/2011 | Occhino et al. |
| 2011/0078188 A1 | 3/2011 | Li et al. |
| 2011/0099070 A1 | 4/2011 | Eliason |
| 2011/0153412 A1 | 6/2011 | Novikov et al. |
| 2011/0231478 A1 | 9/2011 | Wheeler et al. |
| 2011/0264736 A1 | 10/2011 | Zuckerberg et al. |
| 2011/0265011 A1 | 10/2011 | Taylor et al. |
| 2011/0270649 A1 | 11/2011 | Kerho |
| 2011/0288917 A1 | 11/2011 | Wanek et al. |
| 2011/0307312 A1 | 12/2011 | Goeldi |
| 2011/0313996 A1 | 12/2011 | Strauss et al. |
| 2012/0047011 A1 | 2/2012 | Rippetoe et al. |
| 2012/0109751 A1 | 5/2012 | Binenstock et al. |
| 2012/0150989 A1 | 6/2012 | Portnoy et al. |

OTHER PUBLICATIONS

Non-Final Office Action for U.S. Appl. No. 12/563,529, dated Jul. 22, 2013.
Non-Final Office Action for U.S. Appl. No. 12/563,529, dated Sep. 8, 2011.
Final Office Action for U.S. Appl. No. 12/563,529, dated Nov. 7, 2013.
Final Office Action for U.S. Appl. No. 12/563,529, dated Apr. 6, 2012.
Non-Final Office Action for U.S. Appl. No. 12/859,675, dated Aug. 1, 2012.
Final Office Action for U.S. Appl. No. 12/859,675, dated Dec. 31, 2012.
Christina Warren, How to: Measure Social Media ROI, Oct. 27, 2009, pp. 4-24. http://mashable.com/2009/10/27/social-media-roi/.
Justin Perkins, Is It Worth It? An ROI Calculator for Social Network Campaigns, Jul. 24, 2007, pp. 1-17, http://frogloop.com/social-network-calculator.
Non-Final Office Action for U.S. Appl. No. 13/105,713, dated Aug. 2, 2013.
Non-Final Office Action for U.S. Appl. No. 13/105,713, dated Nov. 8, 2012.
Final Office Action for U.S. Appl. No. 13/105,713, dated Apr. 11, 2013.
Non-Final Office Action for U.S. Appl. No. 13/018,225, dated Feb. 4, 2013.
Final Office Action for U.S. Appl. No. 13/018,225, dated Aug. 7, 2013.
Non-Final Office Action dated Dec. 2, 2013 for U.S. Appl. No. 13/105,713.
Final Office Action dated May 22, 2014 for U.S. Appl. No. 13/105,713.
Non-Final Office Action for U.S. Appl. No. 12/563,529 dated Mar. 25, 2014.
Final Office Action dated Sep. 9, 2014 for U.S. Appl. No. 12/563,529.
Non-Final Office Action dated Dec. 5, 2014 for U.S. Appl. No. 13/267,772.
Non-Final Office Action dated Dec. 18, 2014 for U.S. Appl. No. 12/859,675.
Non-final Office Action dated Mar. 20, 2015 for U.S. Appl. No. 13/018,225.
How to Write Advertisements that Sell, author unknown, form System, the magazine of Business, dated 1912, downloaded from http://library.duke.edu/digitalcollections/eaa_Q0050/ on Feb. 21, 2015.
History of OOH, downloaded from http://www.oaaa.org/OutofHomeAdvertising/HistoryofOOH.aspx# on Mar. 13, 2015.
Non-final Office Action dated Apr. 8, 2015 for U.S. Appl. No. 13/195,677.
Damien, "The How to Guide to Add Facebook Social Plubins to Your WordPress Site", Apr. 28, 2010, from maketecheasier (downloaded Mar. 28, 2015 from http://www.maketecheasier.com/howto-guide-to-add-facebook-social-plugin-to-your-site/).
Non-final Office Action dated Apr. 14, 2015 for U.S. Appl. No. 12/563,529.

* cited by examiner

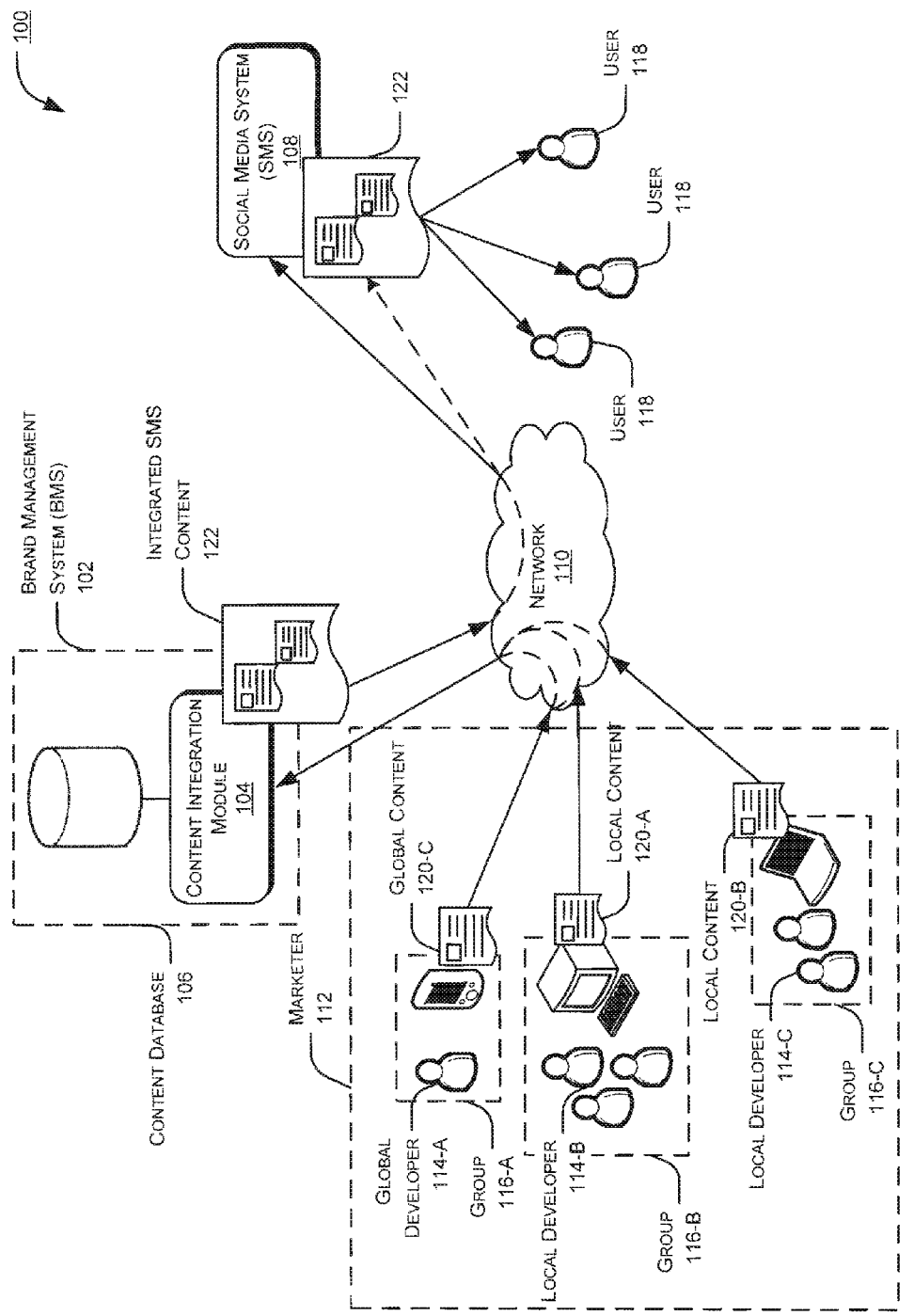
FIG. 1 - Exemplary Brand Management System Environment

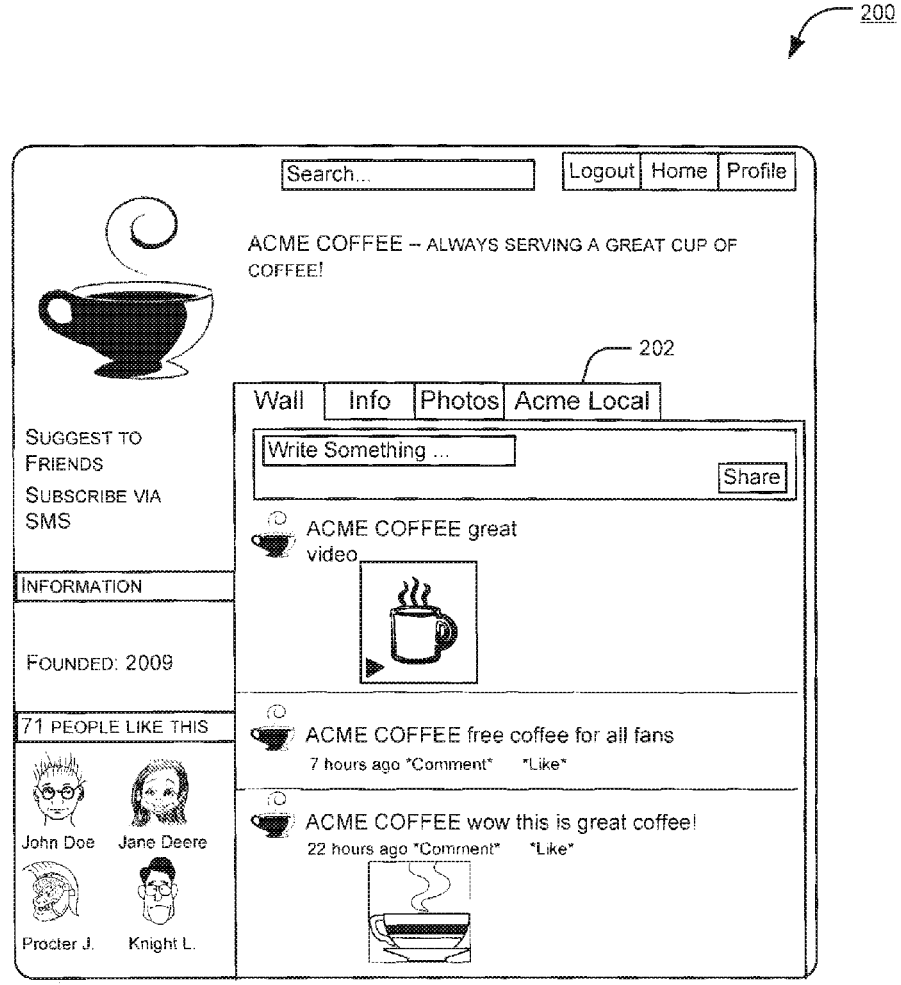
FIG. 2 - Exemplary Global/Corporate SMS Marketing Page

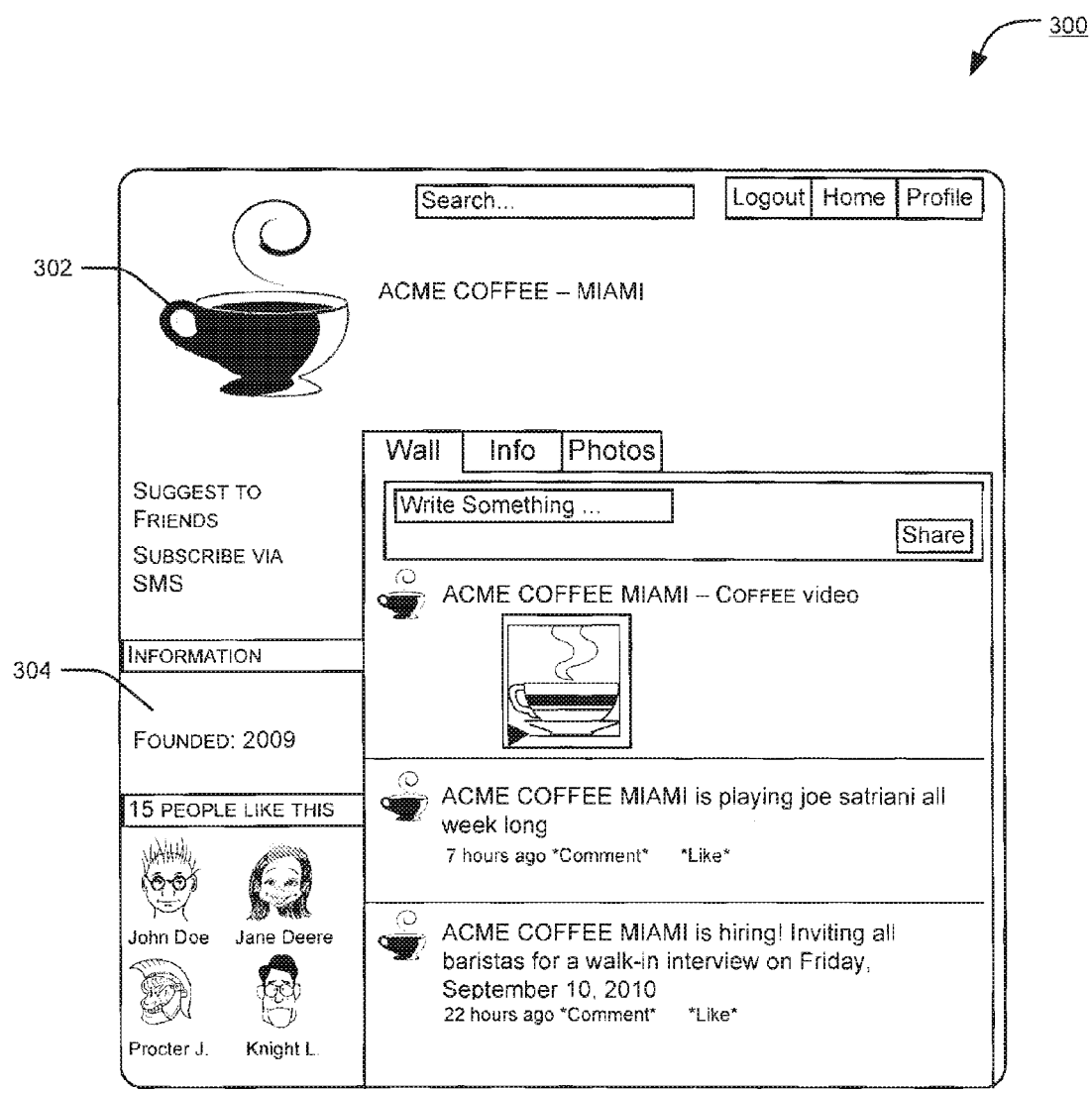
FIG. 3 - Exemplary Local SMS Page - I

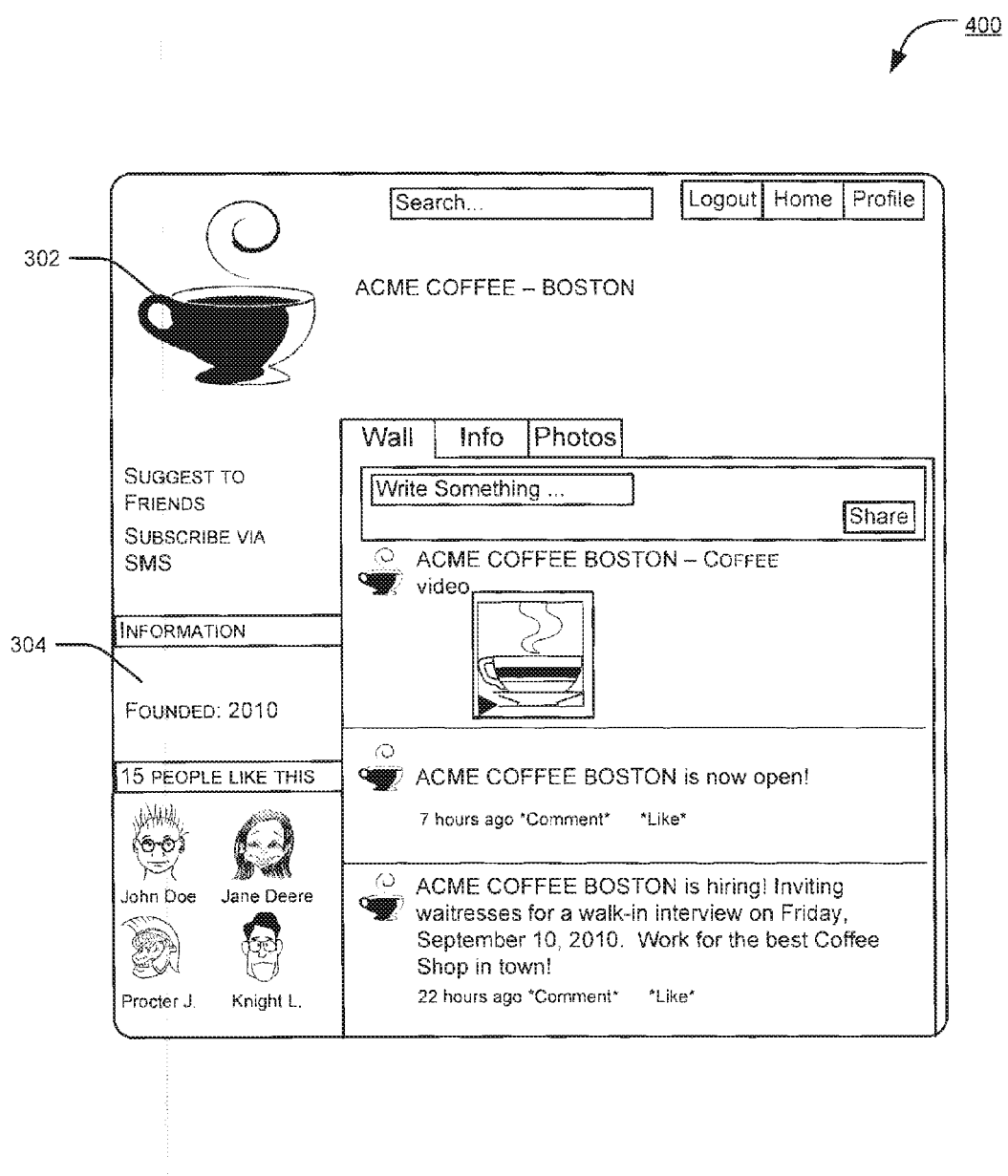
FIG. 4 - Exemplary Local SMS Page - II

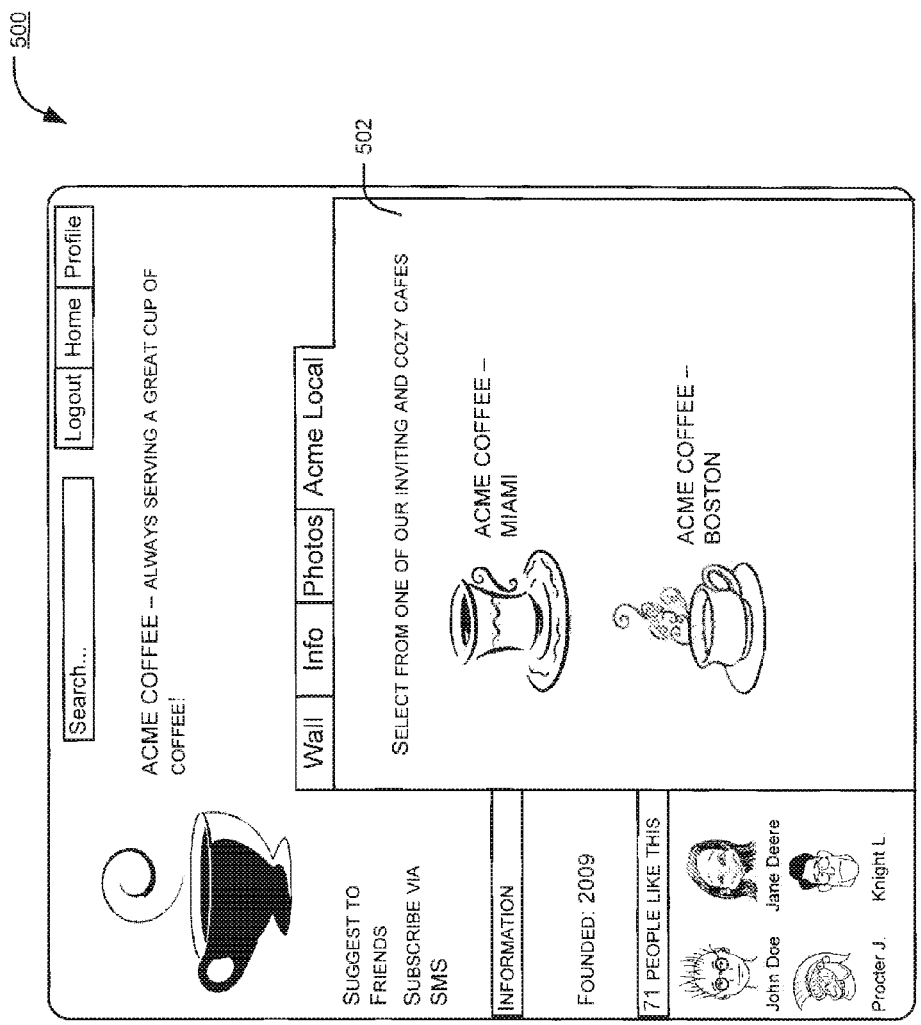
FIG. 5 - Exemplary Locator Screen

FIG. 6 - Exemplary Local Brand Item Display Region

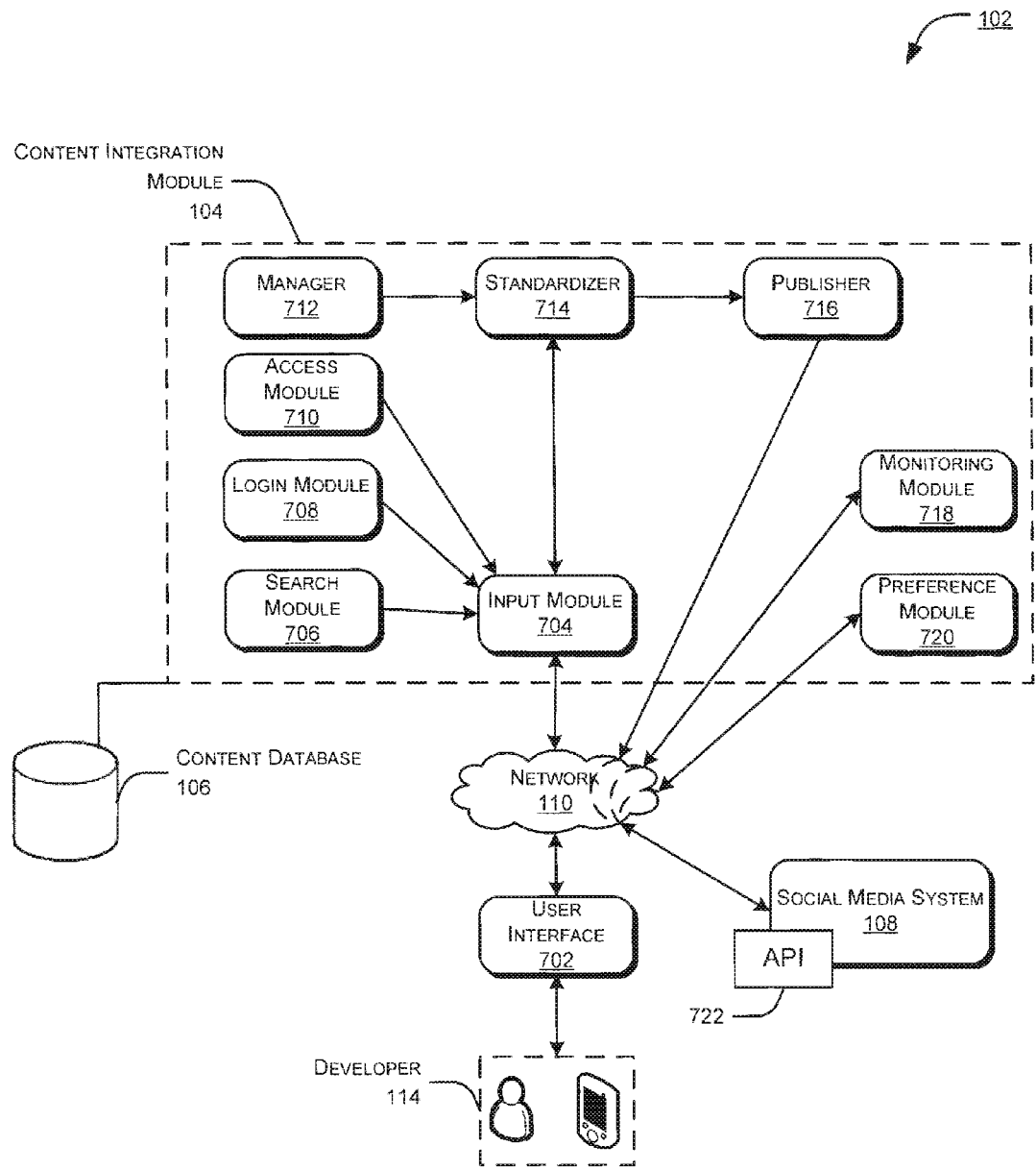
FIG. 7 – Exemplary Brand Management System Architecture

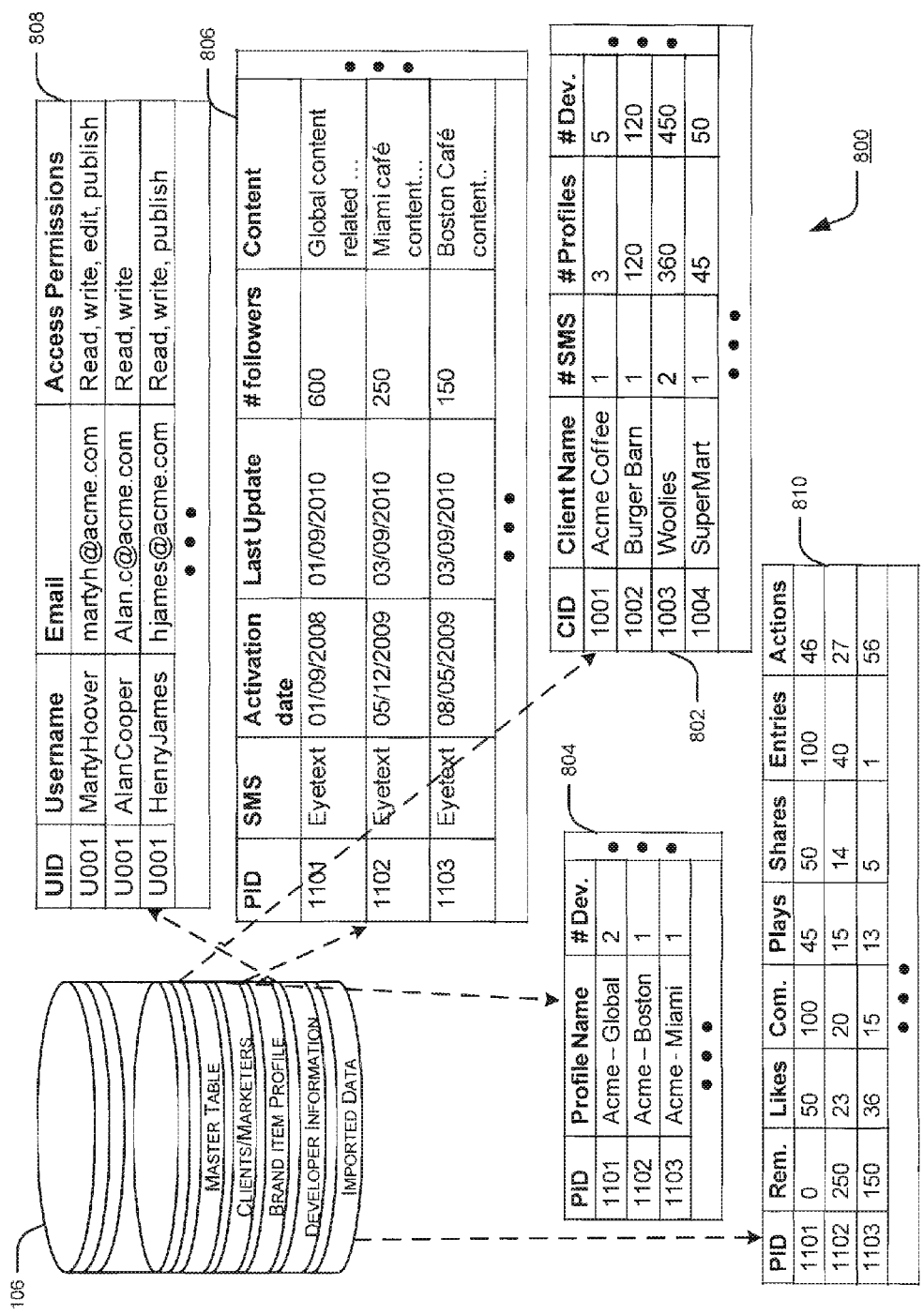
FIG. 8 – Exemplary Content Database Schema

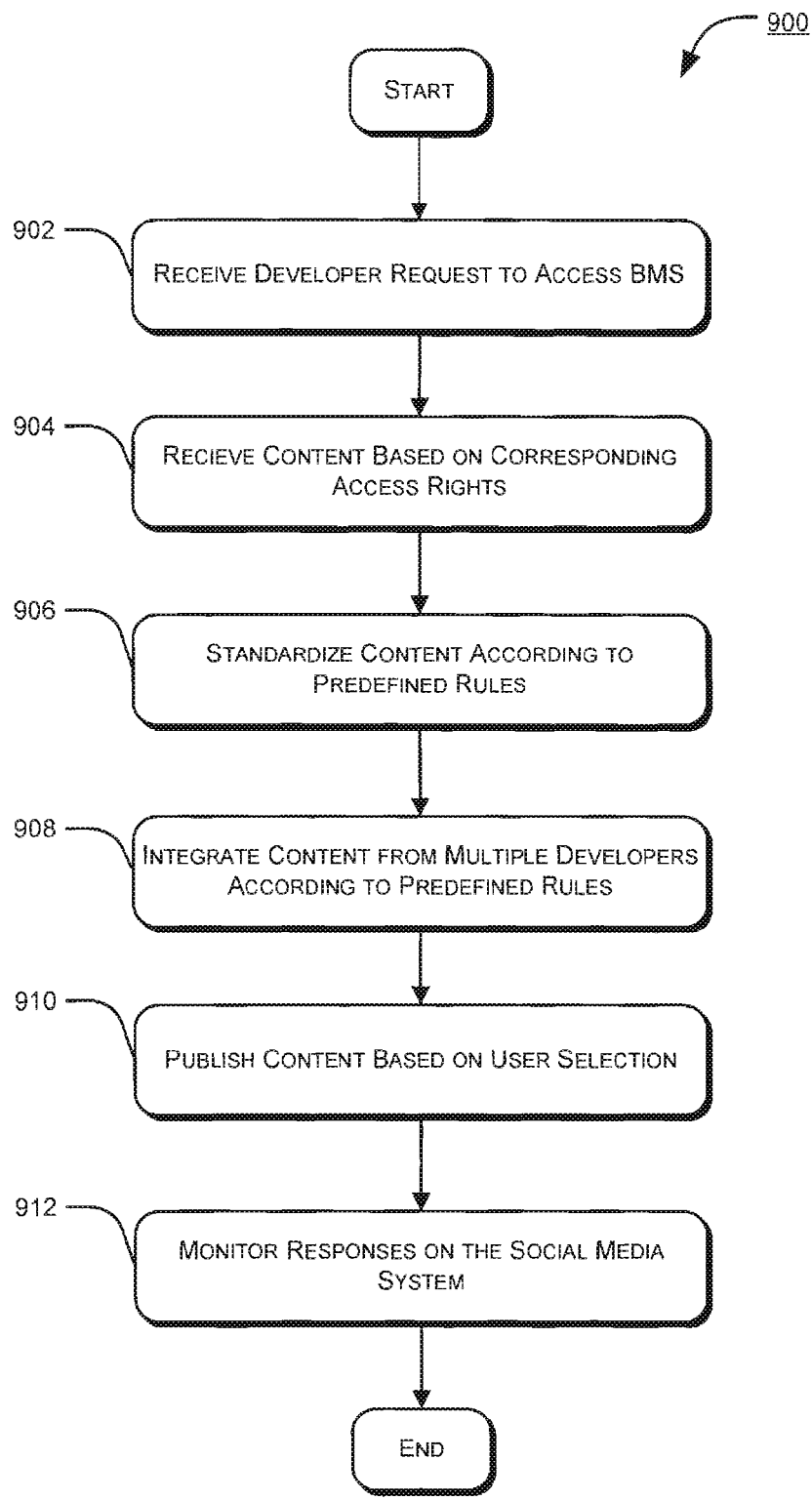
FIG. 9 – Exemplary Brand Management Process

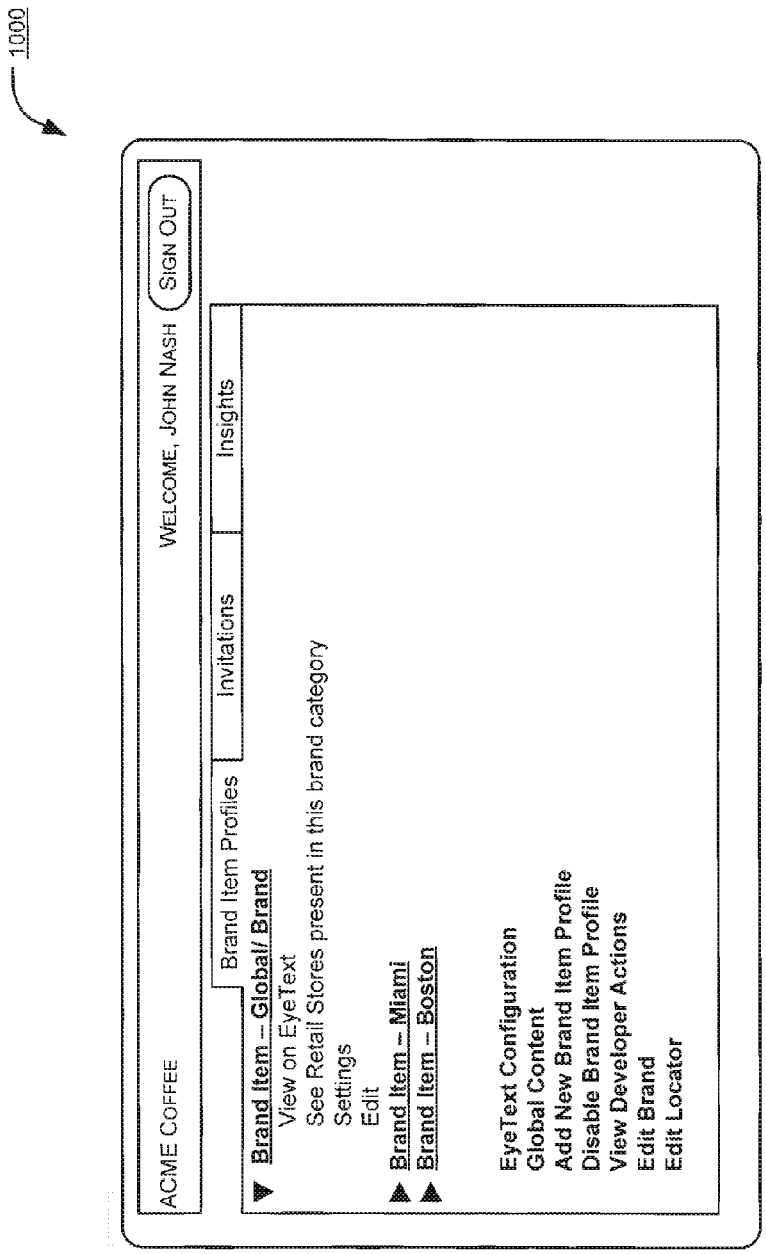
FIG. 10 – Exemplary BMS Homepage Screen

ACME COFFEE

WELCOME, JOHN NASH  SIGN OUT

Brand Item Profiles | Invitations | Insights

Add New Brand Item Profile

Name:
[ACME – New Jersey]

Template:
[Two Column ▼]

Brand Item Profile's Local Time Zone:
[(GMT-08:00) Pacific Time (US & Canada) ▼]

( CREATE )

( BACK )

FIG. 11 – Exemplary Brand Item Profile Creation Screen

```
Add a New Module

+ New Module

┌─────────────────────────────────────────────────┐
  │ Choose Module Type                               │
  │ [Video                ]                          │
  │ Module Name                                      │
  │ [Acme Coffee at it's best]    ( Create Module )  │
  └─────────────────────────────────────────────────┘

+ Reactivate a Module

+ Global Content
```

*FIG. 12 - Exemplary Module Addition Screen*

```
+ Add New Video
  ┌──────────────┬──────────────────┐
  │ Upload Video │ Link from Website│
  ├──────────────┴──────────────────┴──────────┐
  │ Select a video from your computer:          │
  │ [Coffee mug          ]  ( Browse... )       │
  │                                             │
  │ Video File Properties:                      │
  │                                             │
  │ File Name:                                  │
  │ [                    ]                      │
  │                                             │
  │ Link URL:                                   │
  │ [                    ]                      │
  └─────────────────────────────────────────────┘
```

*FIG. 13 - Exemplary Content Addition Screen*

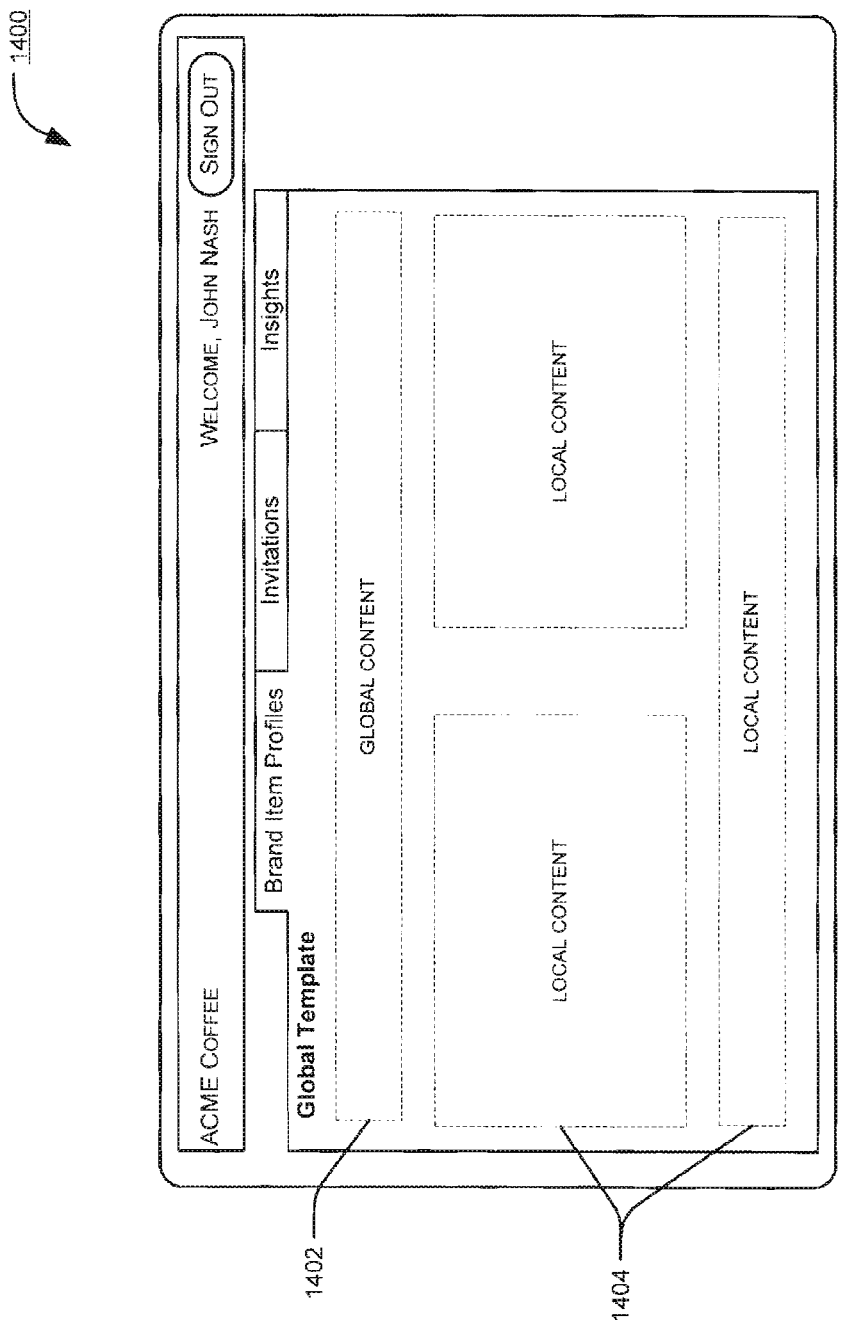
FIG. 14 - Exemplary BMS Template Screen

ACME COFFEE    WELCOME, JOHN NASH    SIGN OUT

| Brand Item Profiles | Invitations | Insights |

Metrics Summary

| Metric | Acme Coffee – Miami | Acme Coffee – Boston | Total |
|---|---|---|---|
| Profile Views | 100 | 150 | 250 |
| Remember Me | 50 | 60 | 110 |
| Module in Use Today | | | |
| Polls | 3 | 5 | 8 |
| Coupons | 35 | 40 | 75 |
| Photos | 3 | 8 | 11 |
| Causes | 1 | 2 | 3 |
| Events | 0 | 1 | 1 |
| Quizzes | 0 | 3 | 3 |
| Feeds | 3 | 5 | 8 |
| Calendars | 1 | 1 | 2 |

Create Charts    Generate Report    From: ☐    To: ☐

FIG. 15 – *Exemplary Metrics Screen*

SYSTEMS AND METHODS FOR MANAGING CONTENT ASSOCIATED WITH MULTIPLE BRAND CATEGORIES WITHIN A SOCIAL MEDIA SYSTEM

CROSS-REFERENCE TO RELATED APPLICATION

This application claims benefit under 35 U.S.C. §119(e) of U.S. Provisional Patent Application No. 61/241,674, filed Sep. 11, 2009, and entitled "System and Method for Social Network Brand Management," which is hereby incorporated by reference as if set forth herein in its entirety.

TECHNICAL FIELD

The present application relates generally to social media systems, and more particularly to methods and systems that support the practice of marketing on social media systems.

BACKGROUND

The popularity of social media websites or portals, such as Facebook®, Twitter®, and others has increased markedly in recent years, compelling marketers and advertisers to analyze the potential of these channels for marketing their products and services. These portals provide a platform for individual users to interact, and at the same time present organizations with potential marketing tools, such as Facebook® pages, or Twitter® handles, enabling marketers to interact with social media "followers." Marketers can post messages or advertisements on these social media systems as a way to advertise outside traditional marketing channels. Members, in turn, can respond by clicking on embedded links, replying to the messages, starting posts based on the messages, or performing other site-specific functions. Further, marketers can embed an organization-specific or marketing campaign-specific URL (webpage address) within the messages, driving users and web traffic to a separate web site.

Even though viral marketing through these social media systems can prove profitable for organizations in terms of additional media coverage, and greater brand awareness, organizations may face difficulties in maintaining and managing content associated with more than one brand category on a given social media system on an ongoing basis. As described here and in greater detail below, a "brand category" relates to a classification of content associated with a given marketer or organization. For example, a brand category for a given company could be retail or franchise locations associated with or operated by the company, product lines within the company, customer segments, trademarks, etc. Within each brand category are individual "brand items", such as individual retail locations, specific products within a product line, etc. (e.g., a Miami store location could be a "brand item" within the "retail locations" brand category). Further, the content associated with a given brand item on a social media system could be text posts, photos, videos, coupons, and other similar types of content related to the brand item and displayed on a social media system web page or account. Details associated with brand items and brand categories are described in greater detail below.

For marketers (e.g., companies, organizations, individuals, etc.), the task of updating and managing social media system pages or accounts associated with these brand categories, and the individual brand items within each category, with new advertising content on a regular basis can become overwhelming. Moreover, management of the social media system content requires a large team of administrators spread across the organization or its franchises. These administrators may have little to no interaction with each other, causing them to follow their own marketing templates, social media page organization schemes, content styles, and other features, which destroys uniformity and brand consistency for the marketer. Additionally, organizations may wish to post common content relating to aspects of the organization that affect all brand categories (such as company-wide sales and promotions, advertisements, etc.), but while preserving local content associated with specific brand items within brand categories (e.g., promotions specific to local franchise locations). Currently no social media system allows organizations to link their content associated with many different brand categories on potentially many different social media system pages or accounts in a cohesive manner to provide a consistent user experience.

Additionally, because marketing data and metrics associated with success or performance of various promotions, advertisements, social media system displays, etc., are spread across multiple social media system pages or accounts, analysis and comparison of the brand items may be cumbersome. No existing service effectively assists marketers and advertisers in managing, structuring and displaying data associated with their brand categories and associated brand items in an integrated and coherent fashion.

Therefore, a long-felt but unresolved need exists for a system or method that structures and integrates third party brand items and social media system pages, displays, or accounts associated with those brand items so as to provide a consistent experience for both social media system members and marketer content administrators. There remains a further need for a system or method that is simple to implement, does not require extensive data analysis, and can be easily configured according to an administrator's preferences.

BRIEF SUMMARY

Briefly described, and according to one embodiment, the present disclosure describes a computer-implemented method for structuring brand item profiles developed by multiple developers on a social media system (SMS). The method includes the steps of receiving a content developer request to access a user interface to enable creation of content based on corresponding access rights. The method further comprises the step of standardizing the content before integrating the content from multiple content developers into a brand item profile according to predefined rules. Finally, the method includes the step of publishing the brand item profile on a page or account on the social media system based on a user selection.

Another embodiment of the present disclosure presents a brand management system for structuring brand item profiles created by multiple content developers on a social media system (SMS). The system includes a user interface for allowing content developers to create specific content and a content development module for standardizing content created by the content developers. The content may include a text string, multimedia message, or a custom file (such as .swf file that will render on more than one social media platform). The system also includes a manager for integrating the specific content created by the content developers into a brand item profile according to predefined rules and a publisher for rendering the brand item profile on a page or account on the social media system based on a user selection.

Certain embodiments of the present disclosure may offer various technical advantages. For instance, large organizations may create, maintain, structure, and integrate content from multiple developers in a cohesive manner, improving user experience, and in turn, producing effective marketing strategies. Moreover, certain embodiments may allow marketers or advertisers to maximize click-through rates by generating interactive and visually stimulating brand item profiles from a single platform. Embodiments of the present system render a unified brand image to customers, while at the same time providing personalized content for their customers.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. The drawings are illustrative in nature and are not necessarily drawn to scale.

FIG. 1 is a block diagram illustrating an exemplary environment where embodiments of the present brand management system are implemented.

FIG. 2 illustrates a screen shot of an exemplary global/corporate social media system marketing page.

FIG. 3 illustrates a screen shot of an exemplary local social media system page.

FIG. 4 illustrates a screen shot of another exemplary local social media system page.

FIG. 5 illustrates an exemplary locator screen.

FIG. 6 illustrates a screen shot of an exemplary brand item display region.

FIG. 7 illustrates exemplary brand management system architecture.

FIG. 8 illustrates an exemplary content database schema.

FIG. 9 illustrates an exemplary method for structuring and rendering content and display regions on a social media system.

FIG. 10 illustrates an exemplary homepage screen for one embodiment of the present brand management system.

FIG. 11 illustrates an exemplary brand item profile creation screen.

FIG. 12 illustrates an exemplary module addition screen.

FIG. 13 illustrates an exemplary content addition screen.

FIG. 14 illustrates an exemplary template screen for creating brand item profile displays according to one embodiment of the present system.

FIG. 15 illustrates an exemplary metrics screen.

DETAILED DESCRIPTION

For promoting an understanding of the principles of the present disclosure, reference will now be made to the embodiments illustrated in the drawings and specific language will be used to describe the same. It will nevertheless be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates. Limitations of scope should be determined in accordance with and as expressed in the claims.

Overview

Embodiments of the present disclosure generally relate to aspects of an Internet-accessible brand management system (BMS) that allows marketers (e.g., corporations, companies, organizations, etc.) to efficiently organize, create, maintain, and display content associated with many brand categories or brand items within a brand category on a single social media system (SMS) page, or alternatively, across many SMS pages or accounts with one or more common content themes. As mentioned previously, a "brand category" corresponds to a classification of content associated with a given marketer or organization. A brand category might comprise product lines within a company, or retail locations within a company, or customer segments, etc.

Most corporations or marketers have established a presence on at least one social media system, such as Facebook®. That presence could take the form of a global or corporate social media system page or account, which may relate to advertising content associated with a marketer as a whole rather than content associated with its individual products or retail locations. Social media system users may express affinity for the marketer by following the marketer's global or corporate social media system marketing page, by becoming a "fan" of the global page on Facebook®, for example. Through the global marketing page or account, organizations can communicate with their fans by posting content, such as messages, advertisements, contests, and the like.

In addition to the global marketing page, large marketers often desire to create multiple "local marketing pages," which include content (e.g., text posts, videos, audio files, images, electronic coupons, etc.) that relates to individual brand items within a brand category, such as discrete product lines, franchises, locations, customer segments, etc., of the marketer. By allowing social media system members to follow content within discrete brand categories (such as programs related to their most preferred product or retail outlet), marketers create a more personal image, and keep fans engaged.

However, managing many different brand categories and individual content within each category poses a daunting logistical challenge. For instance, employees of a retail giant (e.g., Best Buy®, McDonald's®, JC Penney®, etc.), with stores in every major city, may create and update their own social media system pages or accounts for their respective stores, and perhaps without the corporate marketer's permission. Content administrators of the local social media system pages may be present in different geographical locations, and moreover, may be employed under different management, and therefore, the content on each local marketing page may follow a different display format, style, content type, etc., thereby creating varied look and feel and non-uniformity amongst the marketer's brand items. Currently, social media systems do not allow marketers to integrate multiple brand categories and brand items within those categories, thereby allowing centralized and localized management simultaneously.

Embodiments of the present disclosure present a brand management system (BMS) that allows marketers to maintain and integrate content across many brand categories in a social media system in a uniform fashion. Administrators/developers of individual marketing pages or accounts (global and local) may update their pages through the brand management system using standard configurable templates. The system may integrate content from one or more developers to create content for varying pages (for example, by incorporating some global content into local pages according to configurable rules, or vice versa). Subsequently, when a social media system user requests content associated with a particular brand category or brand item within that category on a social media system, the brand management system renders the updated, requested marketing page associated with that category, but within a global marketer page, or with common marketer content also provided (described in greater detail below).

In one embodiment, an organization maintains one "global" or "corporate" or unitary SMS web page or account relating to common aspects associated with the organization, but within the global page also maintains a plurality of display regions relating to individual brand items associated with the organization's brand categories. For example, a marketer may present a global SMS page, but within the page are many different display regions relating to individual franchise locations of the marketer. Within the individual display regions may be content that relates specifically to the individual franchise locations, such as location-specific offers, information about upcoming events, hours and location information, etc. Or, each individual display region may relate to a specific product sold by the marketer, or some other brand item-related content. This functionality enables brand item-specific content to be displayed in a uniform fashion within a marketer's global page or account. A SMS user, through an application introduced by the BMS on the global marketer page, may search for and select his or her preferred brand item, which is then displayed in a appropriate display region. The brand management system may then render the selected brand item profile within the global SMS page (as referred to herein, a "brand item profile" relates to a collection of data associated with a given brand item that is displayed to a SMS user via a specific display region or separate SMS page/account).

In an alternate embodiment, rather than maintaining one global SMS page/account, a marketer maintains (or allows its various employees/administrators) a plurality of separate SMS pages/accounts, but ties the pages together with common marketer elements. For example, each separate SMS page may be required to include certain marketer-prescribed content, such as the marketer's logo, a slogan, etc. Or, the marketer may require that certain display regions within each individual SMS page include certain marketer-specified content, or comprise a marketer-defined format or "look and feel." Accordingly, by requiring that content developers within an organization or within its various divisions, retail locations, etc. create SMS content via an embodiment of the brand management system, the system forces the content to conform to predefined rules, resulting in a standardized, integrated overall SMS experience for SMS users that view the marketer's SMS pages or accounts.

Exemplary Network

FIG. 1 illustrates an exemplary environment 100 in which embodiments of the brand management system may be implemented. The brand management system (BMS) 102 includes a content integration module 104 and a content database 106. The BMS 102 is connected to one or more social media systems (SMS's) 108 through a network 110, such as the Internet. Clients/marketers, represented here by individual marketer 112 (e.g., companies, organizations, individuals, etc.), may access the BMS 102 through the network 110 to create, update, and manage content for their SMS accounts (e.g., Facebook® pages, Twitter® handles, etc.), which may include advertising themes related to marketer branches, branch locations, franchise locations, outlets, product brands, products, or services offered. As referred to herein, a "client" or "marketer" represents an entity, such as a large company that wishes to utilize the BMS 102 to manage content corresponding to its brand categories. As mentioned previously, a "brand category" refers to a classification of content associated with the marketer, such as retail locations, products, services, customer segments, etc. The client 112 may further include multiple content developers or administrators 114 that interact with the BMS 102 using one or more computing devices (such as cell phones, PDAs, desktops, laptops, tablets, notebooks).

In one embodiment, developers 114 manage content for one or more brand items within a particular brand category or categories for the client 112. As referred to herein, a "developer" represents an individual associated with a client that has access privileges to create advertising content to post to the client's 112 social media system accounts. As also referred to herein, a "brand item" refers to a particular division within a brand category, such as a specific retail location within a "locations" category. An example of a developer is an employee of the client within the client's marketing department, or at a given retail location, etc. Moreover, multiple developers 114 may develop content simultaneously for the same brand item profile or different profiles. For example, a retail chain may have three developers for a retail store, for a group of retail stores in a locality, or for all the retail stores in a specific area. As referred to herein, a "brand item profile" relates to a collection of data or content associated with a given brand item that is to be displayed to a SMS user on a SMS page or display region.

FIG. 1 illustrates three developer groups 116 for a particular marketer 112. It will be understood that different numbers of developers 114 are depicted in each group merely to indicate that the BMS 102 may support one or more developers 114 for a single brand item or client 112. Moreover, it will be understood that in actual situations the number of developers 114 (e.g., hundreds of developers 114) or developer groups 116 associated with a particular client 112 may vary considerably from time to time depending on a number of factors, such as organization size, number of content categories, content publishing patterns, and other factors.

Members of the social media system (such as users 118) can access a marketer's various SMS pages, accounts, brand item profiles, etc. on the system 108 through the network 110. As referred to herein, a "member" of a social media system 108 is an end user of the system. Thus, the messages and content created by clients and developers will be generally targeted to SMS members 118.

Traditionally, developer groups 116 access their respective SMS accounts on the social media systems 108 directly through those systems, and publish messages/posts, or respond to user activity on the given SMS's. A message may typically include content, such as text, images, video, and the like. Users 118 may reply to the messages, post comments, etc. The overall purpose of the posts and corresponding user interaction is to create user interest in the marketer's goods or services—similar to traditional advertising. In this typical situation, the individual brand item profile of each developer or group of developers offers a disconnected experience to the users 118, as the look and feel of these brand item profiles may be very different. For example, an individual franchise location may create its own SMS account and corresponding brand item profile for the location, and that profile may look and feel very different from other pages or profiles associated with the marketer. Further, each individual brand item profile may utilize different logos, themes, colors, etc., as compared to others within an organization.

Embodiments of the present disclosure obviate these problems by presenting a single integrated platform (e.g., BMS 102) that enables a marketer/client and its developers to link various SMS accounts and brand item profiles, create standardized content, generate singular SMS web pages for a common user experience, and conduct other similar functions. Developers 114 may log in to the BMS 102 and create or update content for their respective brand item profiles. The BMS may then assist the developers in standardizing the content, and it may assimilate content created by multiple developers to present a more integrated content structure. A client 112 can manage many different brand item profiles, messages associated with those profiles, etc., all from one convenient portal. Moreover, the content of the brand item profiles is not limited by the rules associated with the social media system, allowing marketers to utilize any graphic design, layout, template they desire to create the profiles in line with their brand image (subject to some SMS-mandated formatting rules). These features will be illustrated with a discussion example in the following sections.

By way of example, assume a marketer 112 is a fictitious coffee company, Acme Coffee, and includes café franchises in Boston and Miami (and potentially other locations). The company employs administrators, such as local developers 114-B and 114-C for the locations to generate content, such as local content 120-A and content 120-B. As used in this example, the brand category relates to franchise locations, and individual brand items are the respective locations. Further, as will be understood, the term "local" in this example refers to specific locations, but "local" is intended to represent individual brand items generally within the present disclosure. In the example, assume Acme further assigns one developer group, such as global developers 114-A to manage their global/corporate content 120-C. The developers 114 regularly update content 120 for their respective brand item profiles on the BMS 102, and the content is locally stored in the content database 106. The BMS integrates content from these brand item profiles to create integrated SMS content 122 corresponding to the Miami and Boston cafes. This integrated content 122 is linked or merged with global content to generate a uniform SMS experience relating to the marketer's SMS account(s) for SMS members, as described in greater detail below.

In this example, Acme Coffee creates three brand item profiles for display on its SMS account/page—one for their official corporate content 120-C, one for their local Boston content 120-A, and one for their Miami content 120-B. FIGS. 2-4 illustrate exemplary Acme corporation's global, Miami, and Boston brand item profiles present on separate pages within a social media system, such as Facebook®. Here, the content is displayed in display regions, like typical Facebook® pages, include standard tabs/pages, such as a wall, an information page, photos, etc. It will be understood that Facebook® is merely used here for explanatory purposes, and any other social media systems may be considered just as easily without departing from the scope of the present disclosure. Moreover, it will be understood that the brand items may be associated with any number of pages/tabs; these tabs are, however, not illustrated here for simplicity. Generally, a brand item profile will either be associated with a specific region or regions in a marketer's global/corporate SMS page, or with individual pages that are linked together with common marketer content or display regions.

In one embodiment, the BMS 102 installs an application on top of the social media system 108 that is depicted as a new page/tab on the brand item profile. This tab—"Acme Local" 202 (for example), presents users with a portal to view the brand items created by the developers using the BMS. This page may include a search interface to select a particular brand item profile. It will be understood, however, that any suitable name may be given to the tab/page, such as "featured content," or "product line," etc.

FIG. 5 illustrates the exemplary "Acme local" page, based on a "tab" within the global SMS page for the marketer. As will be understood and appreciated, a "tab" refers to a user-selectable display region that present content within a larger web page. The page includes a selector screen or search interface depicting the brand item profiles associated with Acme Coffee. In this example, the locator screen displays Boston and Miami area café icons. It will be understood that this interface may be presented in any suitable way, such as drop down menus, icons on a map, text interfaces for users to enter zip codes or destination area (such as city, state, or country name), etc. Moreover, the search interface may include a hierarchical structure, wherein the user may drill-down to locate their preferred private brand item profile. As the locator screen is part of the BMS application, marketers may create any type of graphical interface using the BMS system, without departing from the scope of the present disclosure.

For organizations that segregate their brand items based on brand categories relating to product type, divisions, or branches, the search interface may request that users select the desired product or branch using a similar interface (such as a product locator screen). As will be understood and appreciated, embodiments of the present disclosure are not limited to the specific brand categories described or shown, and other brand categories are contemplated as will occur to one of ordinary skill in the art.

Figure 6:
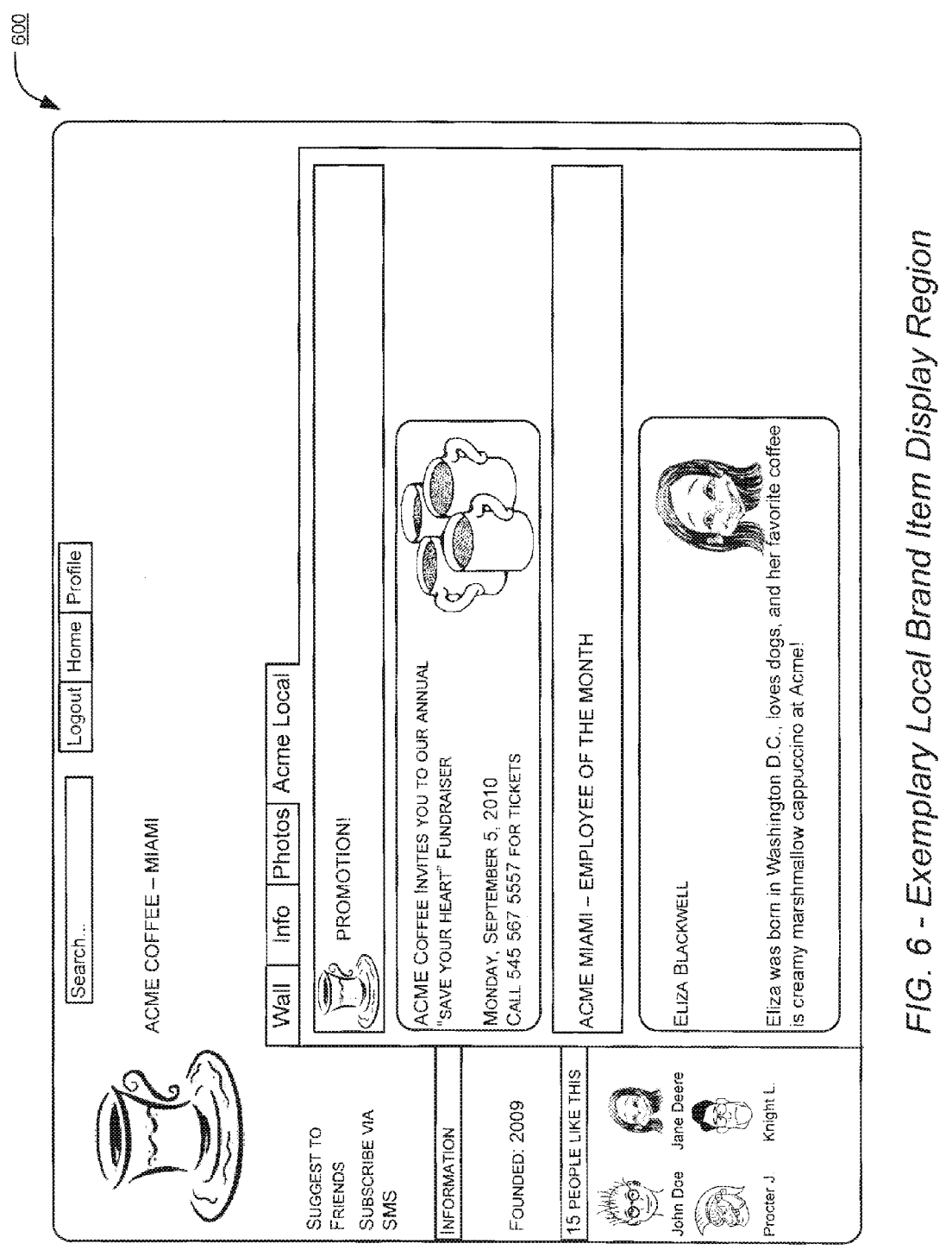

FIG. 2 represents one embodiment of a display screen associated with an SMS page of the present BMS 102. Specifically, FIG. 2 illustrates a marketer's global or corporate SMS page 200. The SMS page includes a local "tab" 202 that enables an SMS user to select and/or view content associated with local branch locations of the marketer. As will be understood, "local" as used herein suggests any brand item within a brand category, and not necessarily a geographic location. When a user clicks on the local tab 202, the user is shown a locator screen 502, as shown in FIG. 5. In the example shown, the locator screen provides icons relating to individual brand items (in this case, marketer locations). By clicking on an given icon, a user is displayed content associated with that particular brand item. For example, referring to FIG. 6, the local content for the Acme Coffee Miami location is displayed. However, this content is displayed within the framework of the marketer's global SMS page, and other global content is maintained within the page.

In another embodiment, FIGS. 3 and 4 represent separate local SMS pages 300, 400 that correspond to individual brand items, but these pages are maintained separate and apart from the marketer's global SMS page. However, to ensure consistency and uniformity amongst these disparate pages, the pages may display marketer-defined or specific content, such as common logos 302, common display regions 304, etc. This embodiment enables a content developer to maintain its own SMS account/page, but also ensures that content specific to the marketer in general is included.

Referring to either embodiment, to render the integrated SMS content 122 created via the BMS 102 and associated with a given brand item profile on the social media system 108, the BMS utilizes the social media system's application programming interface ("API") to seamlessly render data on the social media system 108. Through the API, the BMS can publish or render any BMS-created content on either a "local" SMS page, or within a predetermined display region on a "global" marketer page. In other words, the social media system 108 provides a background or an image-rendering canvas, and the BMS 102 may render any content within that canvas, without necessarily having to adhere to the social media system's predetermined template/format. Because the BMS 102 stores the brand item profiles in its own database, and only renders this information on the social media system 108 when a user requests a particular brand item, marketers are not required to adhere to all of the social media system formats. Each organization can use its own templates, formats, graphic designs, etc., to create lasting impressions on users. However, as will be understood, some SMS formats or requirements may be unchangeable, and must remain in place. Using the BMS 102, marketers can create either a global SMS page/account with brand item profile display regions, or can inject common global content into separate, brand item-specific SMS pages/accounts Exemplary System FIG. 7 illustrates an exemplary architecture for an embodiment of the brand management system 102 for structuring and rendering one or more brand item profiles within one or more brand categories on a web page or account of a social media system of a given marketer. As shown, the BMS 102 includes the content integration module 104, the content database 106, and a user interface 702 connected through the network 110 to an input module 704 for accepting inputs from the developers 114, and displaying system outputs (such as analytics relating to user interaction with various brand item profiles of a marketer).

The content integration module 104 further includes a search module 706 for searching and extracting requested data from the content database 106, a login module 708 for authenticating developers 114, and an access module 710 for managing their access permissions. A manager 712 integrates content from one or more developers to create integrated SMS content 122.

The content integration module 104 further includes a standardizer 714 for formatting the brand item profiles according to predefined rules, and a publisher 716 for rendering the brand item profiles on the social media system 108 when requested.

In addition to these modules, the content integration module 104 may also include numerous other modules and applications to support and extend the capabilities of the BMS 102. For instance, the content integration module 104 may include a monitoring module 718 to track activity and extract marketing metrics, such as number of hits, responses, etc., from the social media system. Moreover, the monitoring module 718 may import user responses for the rendered brand item profiles from the social media system for analysis. The BMS 102 may also include a preference module 720 that monitors user preferences on the social media system 108 and stores this information for subsequent user visits. Apart from these modules, the content integration module 104 may include numerous other modules and databases, which will be described in detail in the following sections.

The publisher 716, monitoring module 718, and the preference module 720 all communicate with the social media system 108 using the social media system's application programming interface (API). As shown in FIG. 7, the social media system 108 includes an API 722 that enables these modules to interact seamlessly with the social media system 108. As is understood in the art, an API is an interface that enables the software systems of the social media system 108 to interact with the software systems of the BMS 102. In this way, developers of a particular client can interact with the BMS system to publish content associated with their respective brand items without directly accessing the social media system 108. This enables more efficient and centralized management of multiple brand item profiles across social media systems. This also enables various contributors with different access levels to coordinate and contribute content to a given brand item profiles based on predetermined settings and rules not necessarily available directly through the given social media systems' conventional interface.

User Interface and Input Module

According to one embodiment, the BMS accepts developer inputs. For this purpose, the BMS includes a user interface 702 that accepts instructions from developers 114 and forwards the instructions to the input module 704. The user instructions may include prompts to login to the system, or other system management instructions, as desired. The user interface 702 may be a web-based interface or an application that is downloadable on the developers computing device. The input module 704 accepts user instructions, and based on the type of instruction, it forwards the instructions to the appropriate module. According to one aspect, the user interface also enables content creation, brand item profile creation and revision, review and management of content and brand item profiles, publishing of brand item profiles to SMS web pages or accounts, and various other functions as will be understood and appreciated by one of ordinary skill in the art.

Search Module

In one embodiment, the search module 706 searches the content database 106 for required content, e.g., content associated with brand items with brand categories present on the content database 106, retrieves the content, and forwards it to the desired module. This module may be embodied in numerous ways. For example, if the user interface 702 renders a locator page with a list of brand item profiles to select from, the search module 706 may merely link the list of brand item profiles to the appropriate content stored in the content database 106. Alternatively, if the locator page requires user input, such as text or voice command, the search module 706 may decipher the user input, and retrieve the relevant brand item profiles. For example, if the locator screen that requests users 118 enter zip codes, the search module 706 may maintain a lookup table to determine the appropriate brand item profile (e.g., specific marketer franchise location) for retrieval.

Login Module and Access Module

The login module 708 manages developer authentication. To this end, the login module 708 renders a login screen on the user interface requesting that the developer supply authentication details, such as username, email address, social media system credentials, password, etc. It will be understood that the login module 708 may use any of the known and widely accepted login procedures known in the art. By comparing developer input information with stored developer credentials, the login module 708 grants access to the developer.

The access module 710 is invoked once a developer accesses the system. The access module 710 maintains a lookup table in the content database 106 that specifies the access permissions associated with a developer. For instance, a global developer 114-C may have complete access to all marketer content, including all brand item profiles (e.g., local content for each marketer retail location, or product-specific content, etc.); while a local developer, such as the Boston local developer for Acme coffee might have full access to the Boston brand item profile, no access to the Miami brand item profile, and perhaps partial access (i.e., creating and edits rights, but no publishing rights) to the global marketing page or account on the respective SMS 108. These stored rights are cross-checked when the developer attempts to complete any task. If the developer has permission, access is granted; else, access is denied. In one embodiment, the BMS 102 renders a different user interface for each developer. For example, only tasks for which the particular developer has permission are depicted. It will be understood that any other known access governing protocols may be implemented to manage access rights without departing from the scope of the present disclosure.

Manager

The manager 712 integrates content from various brand item profiles or developers according to predefined rules. Developers may create content, such as posts, advertisements, quizzes, photographs, audio files, text, etc., and store this content on the content database 106. Based on their preferences, developers may add some or all of this content to their brand item profiles. For instance, developers may create content for an entire month, beforehand, and store the content on the content database 106. Then, using the manager 712, developers may set certain rules, such as, schedule incorporation of content in the brand item profile, as required.

Alternatively, the developers may edit brand item profiles on the fly and save the changes. In one embodiment, the profiles may have predefined placeholders, defined by a global developer. Placeholders are similar to landing pages used in website creation. It will be understood that a person skilled in the art will be aware of such landing pages and placeholders, and therefore these concepts are not described in detail here. Developers may then add content to the placeholders, alter their placement, move content around, create new content for the placeholders, remove old posts, and so on. Alternatively, the local content developers may define their own content placeholders. Moreover, developers may add content to their brand item profiles from the content created by them, or from the content created by the global developer, or by another local developer in the BMS 102. For example, the marketer logo may be placed on all profiles by the global developer to integrate and link together the individual SMS pages and/or brand item profiles, and local developers may not have permission to modify that content.

In another embodiment, the global content, such as advertisements, quizzes, announcements, etc., may be created by the global developers and saved in the content database 106. The global developer may establish whether this content may be utilized by local developers. Local developers who have access to the content, may then select the content type they wish to include in their global content placeholders. Moreover, developers may automate this incorporation. For instance, a local developer may create rules to incorporate any global advertisement updated by the global developer either in real time or at predefined intervals.

Based on these rules, configurations, and developer preferences, the manager 712 integrates content from various sources to create a brand item profile, which is stored in the content database 106. The rules may be set either by the global developer for each brand item profile, or by the local developers responsible for a particular brand item profile, without departing from the scope of the present disclosure.

Standardizer

The standardizer 714 ensures that content from different developers 114 adheres to predefined rules and policies configured by the marketer or, in some instances, by the social media system. The global developer 114 may configure the format, such as font size, text type, maximum characters, multimedia format, brand item profile layout, required icons or images, required display regions, and other similar details to present a consistent look and feel across all the brand item profiles. Moreover, the standardizer 714 may be configured to incorporate social media system 108 rules, such as image size, text length, etc. In one embodiment, the standardizer 714 may allow developers 114 to create content and later check the content for compatibility with the predefined rules. The standardizer 714 may subsequently prompt the developer 114 to modify the content according to the rules, automatically modify the content to comply with the rules, or it may automatically insure corrections, as determined by the system.

Alternatively, the standardizer 714 may simply not allow developers 114 to create content that does not comply with the rules. For example, if the character length is set to 250 characters, for instance, the standardizer 714 may prevent the developer 114 from entering text beyond 250 characters. Similarly, if the standardizer 714 is configured to prevent developers 114 from attaching media to certain message types, instead of permitting the developer 114 to attach media and subsequently informing the developer 114 of the media rules, the standardizer 714 may not permit the developer 114 to attach media in the first place, by either hiding or deactivating that option.

Further, the standardizer 714 may convert any URL that is embedded into the content into a shorter URL. URLs may be shortened for various reasons. For example, for social media systems 108 that impose character limits, adding very long URL links could potentially exhaust valuable message characters. Those skilled in the art will understand that users 118 are more likely to click-through shorter links than longer ones. For these and other reasons, the standardizer 714 may shorten URLs to a particular format, which redirects the user to the actual URL using a 'Meta Refresh' technology. One advantage of using Meta Refresh to redirect the user to the desired URL is that the user first lands on the shortened link created by the standardizer before being redirected to the actual URL. This initial landing allows the content integration module 104 to track the number of click-throughs to a website even though the destination URL is not associated with the system. Through this tracking, the BMS 102 can gain valuable insights about user behavior, brand item profile success, and so on.

According to one embodiment of the present system, the standardizer 714 saves the original URL and the shortened URL in a lookup table in the content database 106. When a user clicks on the shortened link, the user lands on the short link, and after either a short interval or no interval, the user is redirected to the actual URL.

Publisher

The publisher 716 receives instructions from the monitoring module 715 to publish requested content on a selected brand item profile. Users 118 may select a particular brand item profile, such as the Boston area brand item profile for the fictitious company Acme Coffee. The publisher 716 retrieves data associated with the brand item profile along with content details before publishing the brand item profile. Moreover, if for any reason, the publisher 716 is unable to publish the content to a particular brand item profile, the publisher 716 may generate and circulate an error report to a client 112 and/or its developers 114. Further, the publisher 716 may be configured to retry publication for a given number of times at set intervals.

Monitoring Module

According to one embodiment, the monitoring module 718 monitors the locator screen 502 (or selection display region) on the social media system. Whenever a user selects a particular brand item profile, the monitoring module supplies this information to the search module 706. The search module retrieves the requested brand item profile, and provides the profile content to the publisher, which publishes it to the SMS 108.

The monitoring module 718 also extracts information from member/user responses to the messages posted on social media systems associated with brand item profiles to perform various analytic functions and generate metrics and reports. In one embodiment, the monitoring module 718 observes the various brand item profiles for a marketer and extracts any responses to published messages on the SMS 108. The overall goal of the member responses and corresponding analytics is to determine the relative success of various brand item profiles and messages, and identify helpful information regarding marketing of the client's products, services, etc. The monitoring module 718 may also maintain a tracker for counting useful numbers, such as the number of message replies, plays, and the like. This information can serve as inputs to various analytical programs known to those in the art. Further, the actual messages may also be extracted and stored in the content database 106 for analysis. Users 118 may present recommendations, suggestions, or interests, and that may be useful for generating future marketing strategies. Reports, such as interactive charts, and graphs, can be generated on a planned or ad hoc basis.

Moreover, the monitoring module 718 extracts performance information from the brand items as a whole or overall, such as the number of fans or followers, new requests, and profile activity. Based on this information, developers 114 may set alerts for event notification, such as a sudden change in the fan base. Moreover, clients may compare performance of their brand item profiles to determine which ones are performing better than the rest, and which brand item profiles generate the least activity. This information may be utilized by clients to improve their brand item profiles, to assess developers, to provide incentives, etc.

Preference Module

The preference module 720 monitors the locator screen 502 (or other similar display region) rendered on the social media system 108. When a user selects a particular brand item from the local tab 202 of a global SMS account or page, the preference module 720 stores the user preference along with user details in the content database 106. Alternatively, the locator screen 502 or the subsequent brand item profile may invite the user 118 to configure the selected brand item as their favorite brand item. Consequently, whenever a social media system 108 user accesses the "local" tab 202 of a global marketer SMS page, the preference module 720 looks up the user's credentials against a table of user credentials stored in the content database 106. If the details match, the preference module 720 extracts the user's previous selection, and displays the selected brand item profile directly.

Content Database

The content database 106 stores information about clients, their brand categories, brand items within each brand category, brand item profiles, and their associated information, such as published and unpublished content, and the brand item profile metadata, such as the identity of developers 114, their access permissions and the like. The database also stores content details, contributor information, brand item metrics, and other similar types of information. The content database 106 may be refreshed in real-time by the other modules and stale data may be purged as desired. FIG. 8 illustrates an exemplary database schema 800, which may store data in a relational fashion. A typical relational database includes multiple data tables that include pertinent information, to which other tables can link. FIG. 8 illustrates some exemplary tables that may be present in the content database 106. It will be understood, however, that the number of tables, as well as the data fields and the relations among them may vary depending on the particular embodiment.

The schema 800 includes a master table 802, which catalogues the active clients 112. This table typically includes unique client IDs, and other useful client details. It will be appreciated that other fields may also be contemplated within the scope of the present disclosure. Some exemplary data fields in the master table are client ID, client name, active social media systems, number of active brand item profiles, number of active developers, etc.

The master table 802 may be associated with one or more client tables, such as client table 804. This table includes client specific information such active brand item profiles, their unique IDs, number of developers associated with each brand item profile, etc. This table is associated with tables illustrating features of brand items. The content database 106 may maintain separate brand item profile tables 806 for the clients, or it may store brand item details in one large table. Here, the schema 800 illustrates a brand item profile table 806 caching details of active brand item profiles. Some exemplary data fields in this table include unique brand item profiles IDs, profile name, associated social media system, date of activation, last update date, number of active followers, brand item description, a pointer linking each brand item profile ID to its corresponding content, etc. A content table (not shown) that includes information about all content created by developers—published or unpublished and active or inactive may also be present. This table stores information relating to brand item content, such as unique content IDs, content type, content title, description, creation date and time, publication date and time, embedded URL, author, etc. Other data fields may also be contemplated, such as count of responses, likes, comments, shares, and plays, flags, response messages, or number of revisions, etc.

In addition to these tables, the content database 106 may include other tables and data fields that the content integration module 104 may utilize in certain embodiments. The content database 106, for instance, may include a rules table that stores information about different rules and configurations associated with each brand item profile or client, such as formatting standard rules and policies adopted by the active social media system, adopted by the global developer, or the client. Exemplary fields of this table may be rule ID, rule title, rule thresholds, associated alerts, required content, required format, etc. The content database 106 may incorporate another table that maintains information about the active developers for the brand item profiles. Typical fields in this table (table 810) may be user ID, first name, last name, username, password, email address, phone numbers, social media profiles, access permissions, and other such developer related fields. Further, the database may include a table that stores analytics and information relating to social media system member interaction with messages and brand item profiles such as number of responses to a message, number of likes, shares, click-throughs to linked pages, etc. As will be understood and appreciated, some "responses" to messages will include social media-specific responses, such as the "like" or "share" option offered by Facebook®. A few exemplary fields are illustrated in table 810 in FIG. 8.

It will be understood that the content database 106 may maintain numerous other tables not illustrated here. For example, a table that stores user preferred brand items, and a table that stores alerts, reminders, and triggers for a certain brand item profile or client 112 may be present. Similarly, the content database 106 may maintain a table for shortened URLs and their corresponding actual/longer URLs. As will be understood and appreciated, the specific tables and corresponding data items shown in FIG. 8 are presented for illustrative purposes only, and other types of data as will occur to one of ordinary skill in the art may be utilized according to various embodiments of the present system.

The content database 106 may be updated in real time or on an intermittent basis. As will be further understood, the specific database shown and described is intended to be illustrative only and actual embodiments of the BMS 102 may include various database structures, schemas, etc.

Exemplary Method(s)

The following sections describe exemplary methods for carrying out one or more embodiments of the present disclosure. The methodology described herein is generally intended to describe various features and functionality of various system components described previously. The order in which the methods are described is not intended to be construed as a limitation and any number of the described method steps can be combined in any order to implement the method, or an alternate method. Additionally, individual steps may be deleted from the methods without departing from the spirit and scope of the subject matter described herein. Furthermore, the method can be implemented in any suitable hardware, software, firmware, or the like.

FIG. 9 illustrates an exemplary process for maintaining and structuring content associated with a given marketer on a social media system 108. The method begins at step 902, where the BMS 102 receives a request by a developer 114 to access the user interface 702. The developer 114 may login to the BMS 102 via the user interface 702 by supplying identification details, such as a username (or email address) and a password, or their social media system credentials. The access module 710 utilizes the developer credentials to retrieve the access permissions associated with the developer 114. Based on the associated access permissions, the user interface 702 renders a homepage that greets the developer. According to one aspect, the BMS 102 may render the same homepage for all developers of a client 112. Based on the access rights, however, the developer 114 may not be able to perform all illustrated functions. Alternatively, the user interface 702 may render a different homepage for each developer 114 based on his or her access permissions. Only the functions that the developer 114 has permission to perform may be displayed.

A typical homepage screen 1000 for an embodiment of the BMS 102 is shown in FIG. 10. From here, the developer 114 may view accessible brand item profiles, add new brand item profiles, disable brand item profiles, modify social media system 108 configurations, etc. In addition, the developer 114 may perform actions such as add or invite developers 114, set their access rights, create content, modify content, preview unpublished modifications, create graphs, and other such management specific actions. As will be understood and appreciated, the homepage 1000 acts as a starting point for managing and structuring marketing content on the marketer's SMS web pages, display regions, etc. Here, the homepage 1000 also depicts certain operations that a local developer may not be allowed to perform, such as edit a brand logo, edit the locator screen graphics, and modify the brand item profile template. These functions may be restricted to the global developer in some situations. Alternatively, some marketers may allow their local developers to modify this content, if required. To edit the brand logo, developers may be requested to insert graphics using a programming language, such as visual graphics, or simply browse and insert a digital image. Similarly, to edit he locator screen 502, the developer may modify the locator screen's application code. Alternatively, the user interface 702 may provide a relatively simpler interface to alter the locator (e.g., drop down menus, icons, or radio buttons to select from various colors, themes, images, etc.)

As noted above, the developer 114 may create one or more brand item profiles programs on the BMS 102 (if he or she has access permission). According to one embodiment, "creation" of a brand item profile simply represents the designation of basic information about the brand item, such as a name, duration, etc. Once the particular brand item profiles are created, upon authorization, the developer 114 adds or activates the brand item profiles on the BMS 102.

FIG. 11 illustrates an exemplary brand item profile creation screen. Here, developers enter the name of the brand item profile, select a template type (if multiple options exist), enter a time zone, and perform other similar functions. It will be noted that this screen is merely exemplary, and the content integration module 104 may request any other information from developers to create a brand item profile, such as associated developer information, image format, etc., without departing from the scope of the present disclosure. Authorization and addition of the brand item profiles onto the BMS 102 allows the developers 114 to create content for the brand item profile, structure content as desired, monitor the profile, and extract information about the profile as required.

Referring again to FIG. 9, once the desired brand item profiles are added or created, at step 904, developers 114 may create/modify content on the corresponding brand item profiles based on their access rights. In one embodiment, the BMS 102 may allow developers 114 to create common content (such as global content), which is stored in the content database 106. Subsequently, developers 114 may retrieve the created content as required and add the content to the desired brand item profile. This way, developers 114 do not create the same content numerous times on the brand item profiles. Alternatively, the developer 114 may be allowed to create content or modify content for brand item profiles individually.

When a developer 114 creates a new brand item profile, in one embodiment, the BMS 102 prompts the developer 114 to add modules (i.e., placeholders) for content within the newly-created brand item profile. FIG. 12 illustrates one such module addition screen. Here the developers 114 can select the type of module—text message, image, video, etc. The interface may also prompt the developer 114 to enter a module title to create the module. Once the module is created, the developer 114 may add/modify content associated with that module. FIG. 13 illustrates an exemplary content addition screen. It will be appreciated that this screen is merely exemplary and that numerous ways exist for a developer 114 to add content. For example, the developer 114 may directly generate content without first adding modules. Alternatively, for local brand item profiles, the placeholders and certain global content (such as global campaigns, advertisements, or announcements) may be configured by the global developer 114.

Next, at step 906, the created content is standardized according to predefined rules, such as those set by the client 112 or those imposed by the social media system 108. As described previously, social media system 108 messages may vary based on required standards, such as rules, policies, and formats. For example, such rules or policies include character limits on messages, content requirements, prohibitions on certain types of multimedia content, formatting issues, etc. In addition to these standards, clients may configure their own rules, such as organization of data, text format, image format, video format and quality, quiz format, advertisement format, etc. For example, a client/marketer may dictate that, although local developers may create and maintain their own SMS pages relating to their respective brand item profiles, each of the SMS pages must include the marketer's logo, a standard slogan, and must include a common display region, such as a link to the marketer's corporate website. As another example, a marketer may require that each local developers' brand item profile must be maintained on a singular global SMS page or account, and the content associated with the brand item profiles is contained in predetermined local display regions within the global page (i.e., not on separate pages). In this way, rather than having many discrete and potentially widely-varying SMS pages, handles, accounts, etc., the marketer can maintain control and a common approach to all of its brand categories and associated brand item profiles.

In one embodiment, once the developer 114 enters the content, the standardizer 714 formats the content according to predefined rules. Alternatively, the standardizer 714 may set the placeholder format (FIG. 14), and present a content creation template, which complies with the configured rules. This way, the developer 114 would not be able to enter unformatted content. In addition to these functions, the standardizer 714 may include typical formatting features such as checking spellings, highlighting grammatical errors, analyzing text to determine the tone of the content (formal, informal), screen content for any undesirable language or content such as abusive words, competitor names, racist language, and any other content deemed undesirable. It will be appreciated that step 906 in FIG. 9 is optional, and may not be implemented by some brand management systems or by certain marketers. A similar method to create content and standardize it is illustrated in co-pending U.S. patent application Ser. No. 12/859,675, entitled "Systems and Methods for Managing Marketing Programs on Multiple Social Media Systems", the entire contents of which are hereby incorporated by reference as if set forth herein.

As mentioned above, FIG. 14 illustrates an exemplary BMS template screen 1400 that enables developers or administrators to create content within the BMS for subsequent display on an SMS 108. Specifically, the screen 1400 represents an interface to the BMS back-end application that enables content creation, but also ensures standardized content display for the marketer. For example, in the exemplary screen shown, the user interface 1400 includes a global content display region 1402 and several local content display regions 1402. As will be understood, if a local developer is accessing screen 1400, that developer may not have access rights to vary or change the global content display region 1402. In essence, by predefining content regions, a marketer forces its content developers to arrange and prescribe content for their respective brand item profiles based on a uniform look and feel as compared to all other brand item profiles.

Next (at step 908), the manager 712 integrates content from multiple developers 114 according to predefined rules. The rules may be configured by the global developer or by any other client representative with authority. The type of rules may vary considerably from client to client. The BMS 102 allows marketers to set their own level of granularity while creating SMS pages, brand item profiles, associated content, etc. For example, some marketers may create separate brand item profiles for each retail store, while other marketers may wish to create one brand item profile corresponding to all their retail stores in a particular city or area. In this situation, developers 114 from the stores in a particular city may create content relevant to their stores. The manager 712, integrates content created by these developers either automatically (for instance, by automatically placing content within predefined placeholders for each retail store) or with the help of a head developer.

Other clients may set different integration rules, such as incorporation of the same global data in all or few local brand item profiles, updating global content every week, etc. The manager 712 is configured with the desired rules and thereafter, it may automatically integrate brand item profile content. Moreover, global developers may, from time to time, create global content, which they might want incorporated in one or more local brand item profiles. The integration module, based on the global developer's rules, may place global data such as advertisements, announcements, or quizzes in the selected brand item profiles.

The content is published on the social media system 108 based on user selection, at step 910. As described previously, the client 112 may have a single or multiple brand item profiles. Users of the social media system 108 may visit the client's brand item profiles. These profiles are similar to regular SMS pages present on social media systems 108, but with integrated and common content and/or common display regions, etc. A brand item profile administrator (the global developer) updates this profile. Within these profiles, users 118 may use a separate application to view local brand item profiles. If the client 112 includes more than one local brand item profile, a locator screen 502 present on the client's global SMS page or account greets the users 118. If the user in returning to the brand item profile, however, the preference module 720 might have stored the user 118 preference, and the publisher 716 may directly render the user's previously selected brand item profile, without displaying the locator screen 502. On a user's first visit, or even if a returning user wishes to view a different brand item profile, the locator screen 502 is displayed, and the user 118 may select a particular brand item profile. This selection is monitored by the monitoring module 718 and the preference module 720. The monitoring module 718 provides the selection information to the search module 706. This module in turn retrieves the associated brand item profile from the content database 106 and provides it to the publisher 716 for rendering within the given brand item profile, depending on the situation. The preference module 720 stores the user selection in the content database 106.

Alternatively, if the user 118 visits a local SMS page, the user 118 may not be greeted by the locator screen 502. Instead, the publisher 716 may directly render the corresponding brand item profile on the marketer's SMS account or page.

Referring again to FIG. 9, at step 912, the monitoring module 718 may monitor the social media system 108 for responses to the brand item profiles. The responses may be extracted and stored in the content database 106 for analysis. The monitoring module 718 analyzes these responses to improve marketing strategies, as such responses indicate consumer interest in various products, relative success of brand categories or brand items, and other helpful insights. From the homepage 1000, developers may view the metrics and generate required charts, reports, or presentations. FIG. 15 illustrates an exemplary metrics screen.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present disclosures is defined by the appended claims rather than the foregoing description and the exemplary embodiments described therein.

What is claimed is:

1. A computer-implemented method for managing, via a brand management system (BMS) having a processor and a memory, a plurality of brand item profiles associated with a marketer to be displayed in connection with one or more social media system (SMS) accounts to a plurality of members of one or more SMSs, comprising the steps of:

receiving, from a developer via an interface of the BMS, content information to be integrated into a brand item profile of the plurality of brand item profiles associated with the marketer if the content information satisfies a set of predetermined rules, wherein the BMS is different from the one or more SMSs, and wherein the BMS manages content corresponding to multiple SMSs;

updating the brand item profile with the content information;

using the processor, integrating the brand item profile into a global SMS account, based at least in part upon one or more predetermined content display regions on one or more pages corresponding to the global SMS account, wherein the predetermined content display regions comprise at least one content display region for standardized marketer content and one or more content display regions for brand item profile content; and providing information corresponding to the global SMS account to the respective SMS, such that the one or more pages of the global SMS account, when displayed in response to a request of a member of the respective SMS via a portal of the respective SMS, comprises the standardized marketer content displayed in the at least one content display region for standardized marketer content and the content information associated with the brand item profile displayed in the one or more content display regions for the brand item profile content.

2. The method of claim 1, wherein the content information includes one or more of: text, a video file, a sound file, an image, a photograph, an electronic quiz, an advertisement, a uniform resource locator (URL), a post, a message, an icon.

3. The method of claim 1, wherein the brand item profile comprises a collection of data corresponding to a particular brand item to be displayed to one or more SMS members via the global SMS account.

4. The method of claim 3, wherein the brand item is selected from the group consisting of: a retail location of the marketer, a branch location of the marketer, a franchise location of the marketer, a product of the marketer, a product line of the marketer, a service of the marketer, a consumer segment, a trademark of the marketer.

5. The method of claim 1, wherein a developer is selected from the group consisting of: an employee of the marketer, an employee of a marketer location, an employee of a third party marketing firm associated with the marketer, a content administrator.

6. The method of claim 1, further comprising the step of if a brand item profile does not exist for the content information, generating the brand item profile via the BMS upon receipt of the content information.

7. The method of claim 1, wherein the predetermined rules for entering the content information by the developer include one or more of: marketer-specified format requirements, marketer-specified content style requirements, predetermined content display regions, marketer-required content, SMS-required display regions.

8. The method of claim 1, wherein the global SMS account associated with the marketer is selected from the group consisting of: a SMS web page of the marketer, a SMS handle of the marketer.

9. The method of claim 1, wherein the one or more predetermined display regions include one or more of: a display field, a tab, a drop down menu, a logo field, a text field, an image field, an SMS-required display field.

10. The method of claim 1, further comprising the step of storing a SMS member's preferences to automatically render specific brand item profiles via the portal of the respective SMS when the member logs into the global SMS account of the marketer.

11. A computer-implemented method for managing, via a brand management system (BMS) having a processor and memory, a plurality of brand item profiles associated with a marketer to be displayed in connection with one or more social media system (SMS) accounts to a plurality of members of one or more SMSs, comprising the steps of:

receiving, from a developer via an interface of the BMS, content information to be integrated into a brand item profile of the plurality of brand item profiles associated with the marketer if the content information satisfies a set of predetermined rules, wherein the BMS is different from the one or more SMSs, and wherein the BMS manages content corresponding to multiple SMSs;

updating the brand item profile with the content information, wherein the brand item profile corresponds to a particular SMS account on a respective SMS;

using the processor, integrating additional standardized marketer content information into the brand item profile according to one or more predetermined content display regions on one or more pages corresponding to the particular SMS account, wherein the predetermined content display regions comprise at least one content display region for standardized marketer content and one or more content display regions for brand item profile content; and providing information corresponding to the particular SMS account to the respective SMS, such that a page corresponding to the particular SMS account, when displayed in response to a request of a member of the respective SMS via a portal of the respective SMS, comprises the additional standardized marketer content displayed in the at least one content display region for standardized marketer content and the received content information associated with the brand item profile displayed in the one or more content display regions for the brand item profile content.

12. The method of claim 11, wherein the particular SMS account is associated with the marketer but managed by the developer.

13. The method of claim 11, wherein the marketer content information comprises one or more of: a marketer logo, marketer-specified content, marketer-required display regions, a marketer URL, a marketer search display region, a marketer-required image, a marketer-required video file, a marketer-required audio file, a marketer slogan.

14. The method of claim 11, wherein the content information includes one or more of:

text, a video file, a sound file, an image, a photograph, an electronic quiz, an advertisement, a URL, a post, a message, an icon.

15. The method of claim 11, wherein the brand item profile comprises a collection of data corresponding to a particular brand item to be displayed to one or more SMS members via the particular SMS account.

16. The method of claim 15, wherein the brand item is selected from the group consisting of: a retail location of the marketer, a branch location of the marketer, a franchise location of the marketer, a product of the marketer, a product line of the marketer, a service of the marketer, a consumer segment, a trademark of the marketer.

17. The method of claim 11, wherein a developer is selected from the group consisting of: an employee of the marketer, an employee of a marketer location, an employee of a third party marketing firm associated with the marketer, a content administrator.

18. The method of claim 11, further comprising the step of if a brand item profile does not exist for the content information, generating the brand item profile via the BMS upon receipt of the content information.

19. The method of claim 11, wherein the predetermined rules for entering the content information by the developer include one or more of: marketer-specified format requirements, marketer-specified content style requirements, predetermined content display regions, marketer-required content, SMS-required display regions.

20. The method of claim 11, wherein the particular SMS account is selected from the group consisting of: a SMS web page associated with a particular brand item of the marketer, a SMS handle associated with a particular brand item of the marketer.

21. The method of claim 11, wherein the one or more predetermined display regions include one or more of: a display field, a tab, a drop down menu, a logo field, a text field, an image field, an SMS-required display field.

22. A brand management system (BMS) operatively connected to one or more social media systems (SMSs) for managing a plurality of brand item profiles associated with a marketer and displayed on the one or more SMSs, comprising:

a computer including at least one processor and memory;

an interface that enables a developer to input content information to the BMS, the interface including one or more predetermined rules for entering the content information by the developer, wherein the BMS is different from the one or more SMSs, and wherein the BMS manages content corresponding to multiple SMSs;

an input module for receiving the content information at the BMS from the developer;

a content integration module for associating the content information with a brand item profile of the plurality of brand item profiles in a BMS database, and for, using the processor, integrating the brand item profile into a SMS account associated with the marketer, based at least in part upon one or more predetermined content display regions on one or more pages corresponding to the SMS account, wherein the predetermined content display regions comprise at least one content display region for standardized marketer content and one or more content display regions for brand item profile content; and a communication link between the BMS and a respective SMS to provide operative communications between the BMS and the respective SMS, the communication link configured to transmit information corresponding to the SMS account to the respective SMS, such that the one or more pages of a global SMS account, when displayed in response to a request of a member of the respective SMS via a portal of the respective SMS, comprises the standardized marketer content displayed in the at least one content display region for standardized marketer content and the content information associated with the brand item profile displayed in the one or more content display regions for the brand item profile content.

23. The system of claim 22, wherein the content information includes one or more of:

text, a video file, a sound file, an image, a photograph, an electronic quiz, an advertisement, a URL, a post, a message, an icon.

24. The system of claim 22, wherein the brand item profile comprises a collection of data corresponding to a particular brand item to be displayed to one or more SMS members via the SMS account.

25. The system of claim 24, wherein the particular brand item is selected from the group consisting of: a retail location of the marketer, a branch location of the marketer, a franchise location of the marketer, a product of the marketer, a product line of the marketer, a service of the marketer, a consumer segment, a trademark of the marketer.

26. The system of claim 22, wherein a developer is selected from the group consisting of: an employee of the marketer, an employee of a marketer location, an employee of a third party marketing firm associated with the marketer, a content administrator.

27. The system of claim 22, wherein the content integration module is further configured to if a brand item profile does not exist for the content information, generate the brand item profile via the BMS upon receipt of the content information.

28. The system of claim 22, wherein the predetermined rules for entering the content information by the developer include one or more of: marketer-specified format requirements, marketer-specified content style requirements, predetermined content display regions, marketer-required content, SMS-required display regions.

29. The system of claim 22, wherein the SMS account associated with the marketer is selected from the group consisting of: a global SMS web page of the marketer, a global SMS handle of the marketer, a SMS web page associated with a particular brand item of the marketer, a SMS handle associated with the particular brand item of the marketer.

30. The system of claim 22, wherein the one or more predetermined display regions include one or more of: a display field, a tab, a drop down menu, a logo field, a text field, an image field, an SMS-required display field.

* * * * *